United States Patent
Feyt et al.

(10) Patent No.: US 6,698,662 B1
(45) Date of Patent: Mar. 2, 2004

(54) DEVICES FOR HIDING OPERATIONS PERFORMED IN A MICROPROCESSER CARD

(75) Inventors: Nathalie Feyt, Marseilles (FR); Olivier Benoit, Aubagne (FR); David Naccache, Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/646,564

(22) PCT Filed: Mar. 16, 1999

(86) PCT No.: PCT/FR99/00583
§ 371 (c)(1),
(2), (4) Date: Dec. 18, 2000

(87) PCT Pub. No.: WO99/49416
PCT Pub. Date: Sep. 30, 1999

(30) Foreign Application Priority Data

Mar. 20, 1998 (FR) .............................................. 98 03471

(51) Int. Cl.$^7$ ............................................... G06K 19/06
(52) U.S. Cl. ..................................... 235/492; 235/382.5
(58) Field of Search .............................. 235/380, 382.5, 235/492

(56) References Cited

U.S. PATENT DOCUMENTS

| | | | |
|---|---|---|---|
| 4,211,919 A | * | 7/1980 | Ugon .......................... 235/487 |
| 4,295,041 A | | 10/1981 | Ugon |
| 4,813,024 A | | 3/1989 | Lisimaque et al. |
| 4,827,451 A | * | 5/1989 | Marquot et al. ........ 365/189.01 |
| 4,916,333 A | * | 4/1990 | Kowalski ...................... 326/68 |
| 4,932,053 A | | 6/1990 | Fruhauf et al. |
| 5,404,402 A | * | 4/1995 | Sprunk ........................ 713/189 |
| 5,995,629 A | * | 11/1999 | Reiner ......................... 380/265 |
| 6,064,740 A | * | 5/2000 | Curiger et al. ............... 380/265 |

FOREIGN PATENT DOCUMENTS

WO    WO96/06405    2/1996

* cited by examiner

*Primary Examiner*—Mark Tremblay
(74) *Attorney, Agent, or Firm*—Burns, Doane, Swecker & Mathis, L.L.P.

(57) ABSTRACT

The invention concerns microprocessor cards and, in such cards, various devices for hiding operations performed in the card against fraudulent breaches by analysing the current consumed. The invention is characterised in that it consists in adding in the card a device (20) modifying the consumed current, either by averaging it by integration, or by adding thereto random values by a random signal generator (28) so as to hide the operations performed. In another embodiment, it consists in carrying out simultaneously an operation for making secure and writing in an EEPROM memory, the latter generating chaotic current variations which hide the operation to be made secure.

6 Claims, 3 Drawing Sheets

DEVICES FOR HIDING OPERATIONS PERFORMED IN A MICROPROCESSER CARD

This disclosure is based upon, and claims priority from, French Patent Application No. 98/03471 filed Mar. 20, 1998, and International Application No. PCT/FR99/00583, filed Mar. 16, 1999, the contents of which are incorporated herein by reference.

BACKGROUND OF THE INVENTION

The invention relates to microprocessor cards and, in such cards, different devices for hiding the operations performed in the card for the purpose of improving security against fraudulent intrusions.

Chip cards are divided into several categories, namely:

simple-memory cards, memory cards known as smart cards, and microprocessor cards.

A simple-memory card makes it possible to perform read and write operations freely in the electrically erasable read only memory area. Such a card is inexpensive but does not offer sufficient security so that it is being used less and less.

A smart memory card notably improves the security of the read/write operations by enabling them only when certain conditions implemented in hard-wired form are fulfilled.

A card in the third category contains a microprocessor capable of executing programs recorded in a memory and thus making calculations with secret data inaccessible to the world external to the card. Thus a key recorded in the memory can serve to validate an electronic transaction such as a purchase or a door opening without having to be manipulated outside the card.

Unfortunately, certain microprocessors have current consumptions which depend on the calculations made inside the card. Thus a cryptographic calculation comprising a calculation tree which depends on the digits of the key used will have different current consumption footprints according to the value of the key used. As a result a fraudster could correlate the current consumption footprint of the key used and thus go back to the value of the key.

To prevent this correlation, a usual countermeasure consists of programming the cryptographic algorithm so that, whatever the value of the key, the algorithm will always pass through the same calculation steps.

Many so-called "byte oriented" algorithms lend themselves well to this program mode, but other pose a few technical problems which are surmountable only at the cost of a less optimal calculatory performance.

SUMMARY OF THE INVENTION

The purpose of the invention is therefore to use, in microprocessor cards, devices for hiding the operations performed whilst permitting the programmer the free choice of the programming rules, whether or not they are of the "byte oriented" type.

This purpose is achieved by modifying or scrambling the consumption of the card so that its footprint is independent of the calculations made.

This modification or scrambling of the footprint can be obtained by adding a device to the card which modifies the current consumption.

In a first example embodiment, this device consumes electrical power in an irregular or random manner, which is added to that of the normal consumption.

In a second example embodiment, this device achieves a mean consumption by effecting, for example, an integration of the current consumed.

In a third example embodiment, this device triggers the microprocessor memory erasure or programming circuit which consumes power in a chaotic manner, power which masks the consumption due to the operations performed by the microprocessor during the programming or erasure of the memory.

BRIEF DESCRIPTION OF THE DRAWINGS

Other characteristics and advantages of the present invention will emerge from a reading of the following description of particular example embodiments, the said description being given in relation to the accompanying drawings, in which.

DETAILED DESCRIPTION

Figure 1:
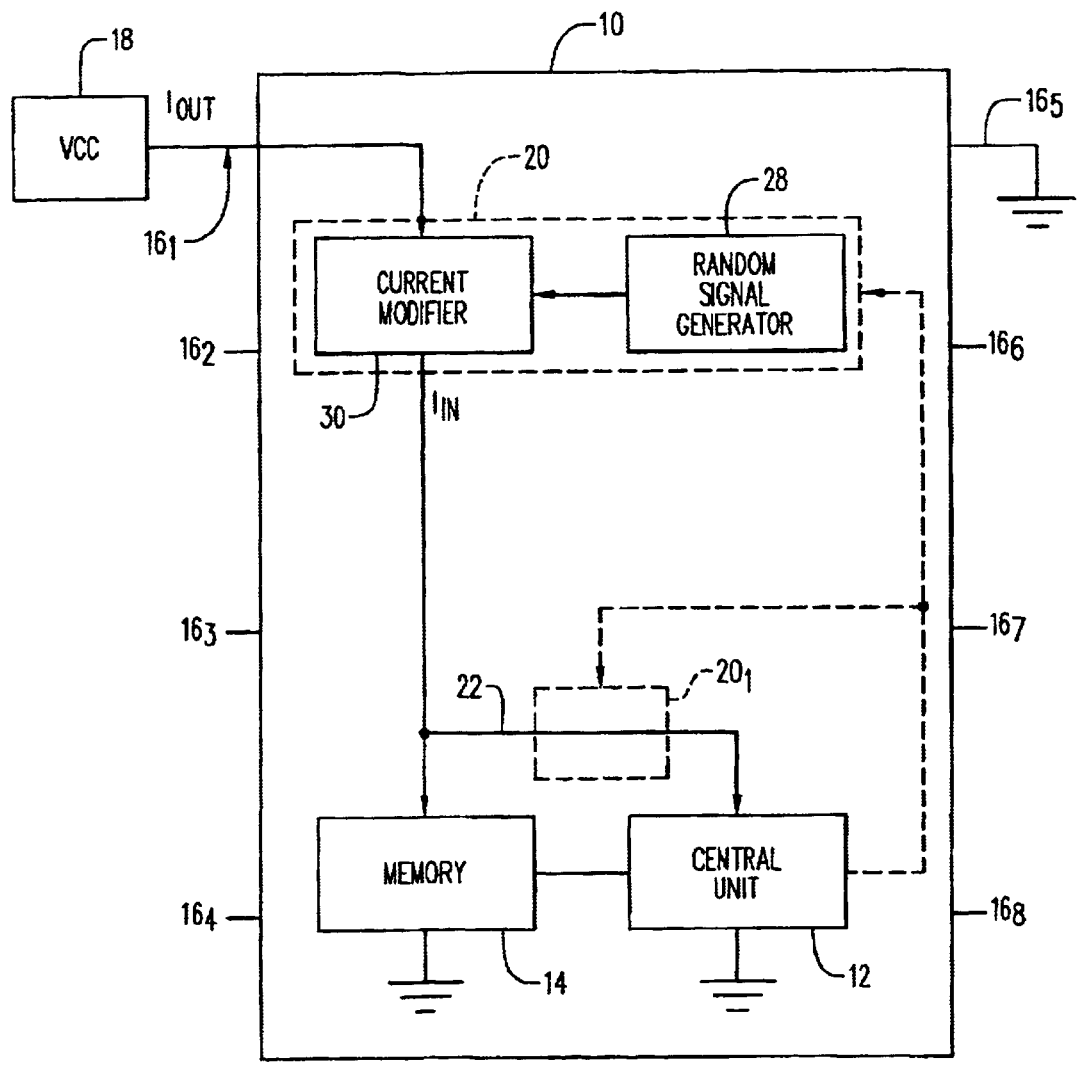
FIG. 1 is a functional diagram of a first example embodiment of the invention.
Figure 2:
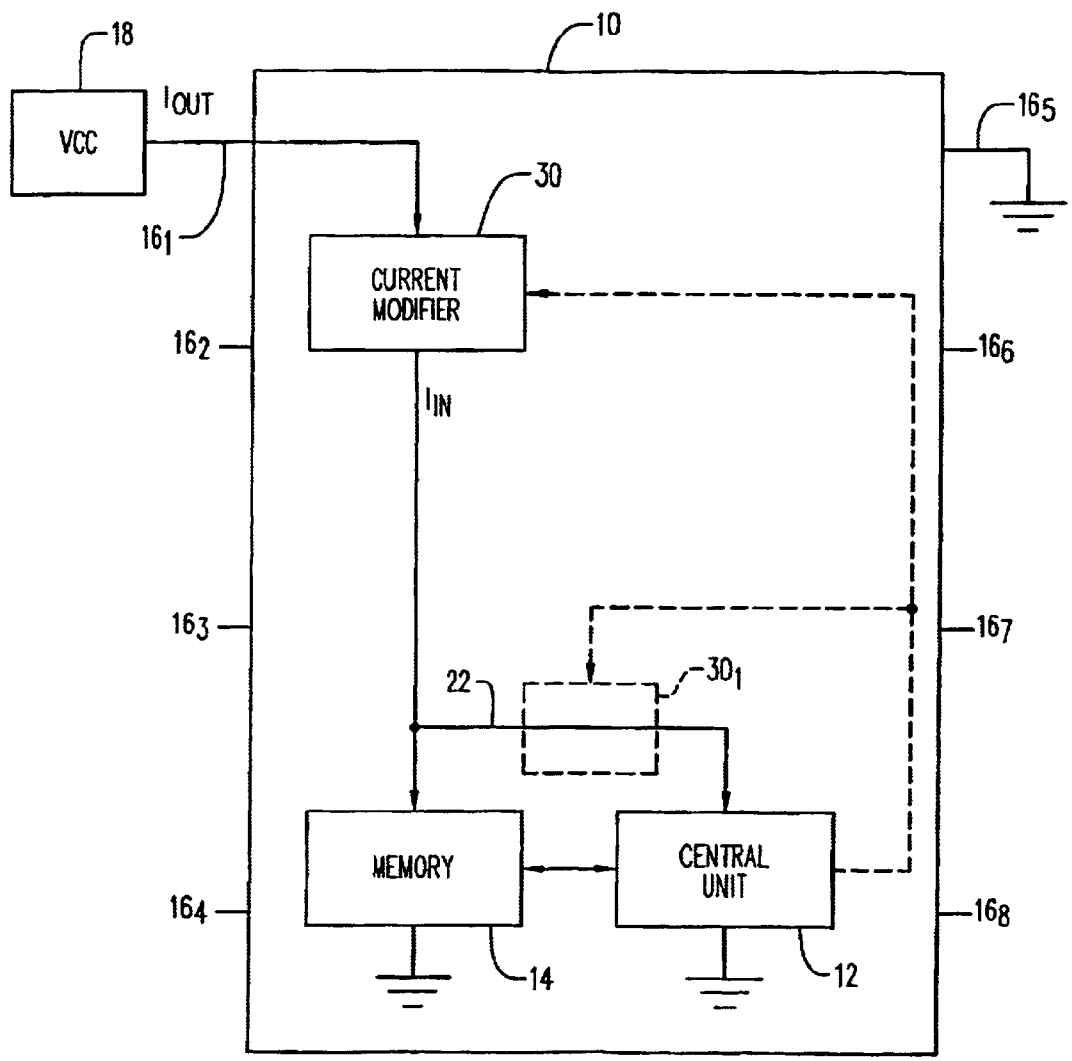
FIG. 2 is a functional diagram of a second example embodiment of the invention.
Figure 3:
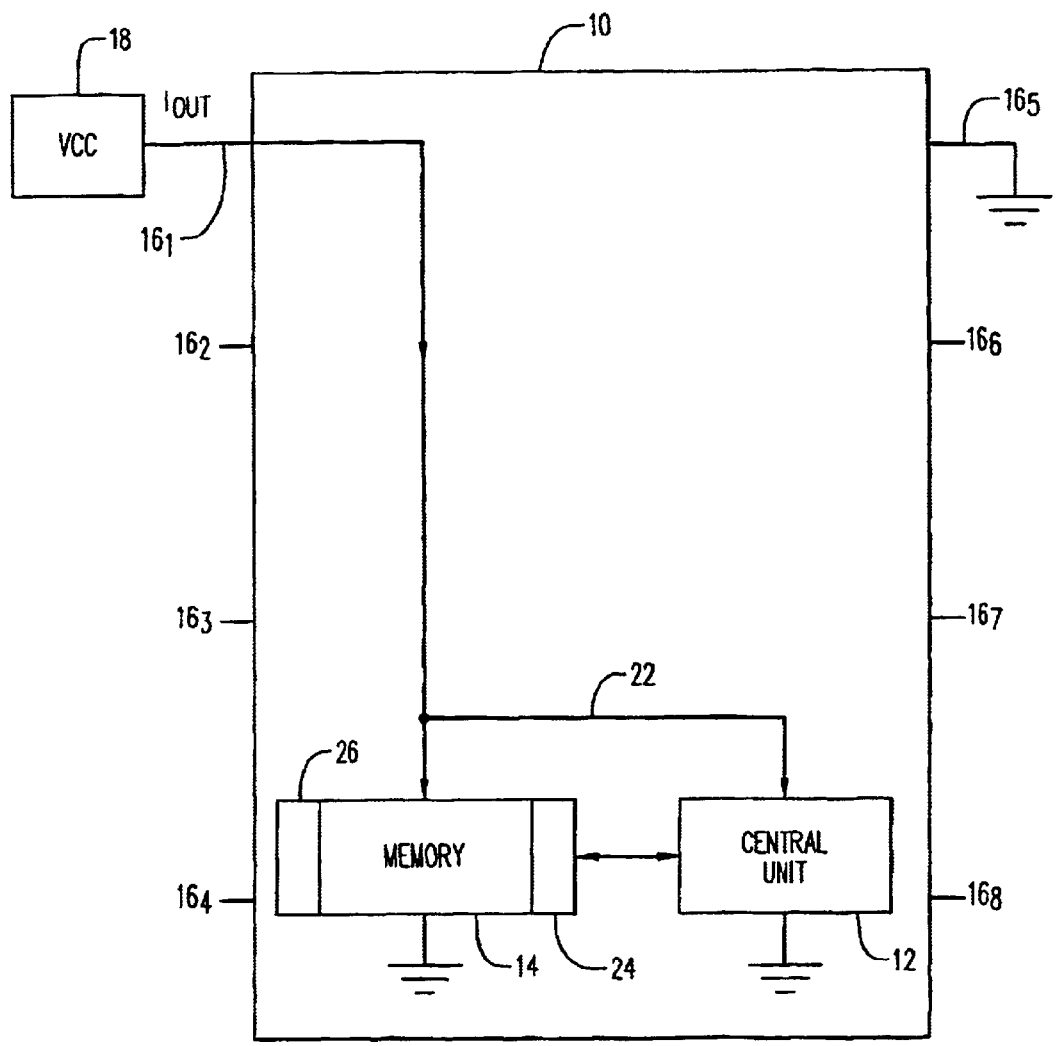
FIG. 3 is a functional diagram of a third example embodiment of the invention.

In the figures, which each show schematically different means for implementing the invention, the electronic chip 10 containing the microprocessor of the card comprises a central unit 12 and at least one memory 14, for example of the type known by the English acronym EEPROM, standing for Electrically Erasable Programmable Read Only Memory. This electronic chip has several input and/or output terminals $16_1$ to $16_8$, one of which, referenced $16_1$, is connected to an electrical circuit 18 supplying voltage $V_{CC}$ whilst the one referenced $16_5$ is connected to ground.

The supply circuit 18 supplies the different elements of the electronic chip 10 with a current $I_{out}$ and, notably, the memory 14 and the central unit 12. This current $I_{out}$ varies according to the operations performed by the central unit and the memory and therefore reflects the cryptographic calculations, which could make it possible to determine the key thereof.

So that this current $I_{out}$ no longer reflects the operations performed, the invention proposes to modify it by means of a device 20 or 30, disposed in the chip 10 and connected, for example, to the input terminal $16_1$.

The invention proposes to modify the current in two different ways. A first by ensuring that the device 20 (FIG. 1) consumes current in a random or at the very least irregular manner, random additional consumption which, added to the normal current consumption $I_{in}$, makes the value $I_{out}$ random.

The second way consists in averaging the value of $I_{in}$, which does not make it possible to detect the variations in $I_{in}$, due to the operations performed.

In the first case, the device 20 can be produced by means of resistors 30, in fact transistors, which are powered or not according to the random signals supplied by a generator 28. The currents flowing in the powered resistors increase, modifying the total current value and hiding the current due to the cryptographic calculations.

In the second case, the average of the current $I_{in}$ is obtained by an integrator which "smooths" the variations in the current $I_{in}$ so as to erase them.

According to the invention, several devices 20 or 30, referenced $20_1$ and $30_1$, can be connected to different points on the electronic chip, for example to the power supply conductor of the central unit (reference 22). In addition, these devices 20, 20₁, 30 and 30₁ can be connected or not, depending on whether the operations are to be protected or not, the connections being made under the control of signals supplied by the central unit 12 (broken lines).

The invention proposes a third way of scrambling the value of $I_{out}$ whilst performing operations to be protected, such as cryptographic calculations, during certain phases of the operations of programming or erasing the memory 14, these operations being under the control of the central unit 12.

This third way is based on the use of a memory 14 of the EEPROM type which has auto-writing capability.

In a normal operating mode, the microprocessor activates a programming circuit 24 of the memory 14 according to the following steps:

1—activation of the charge pump,
2—presentation, on the data bus, of the data item to be written,
3—presentation on the address bus of the writing address,
4—initiation of the programming,
5—waiting during the programming time,
6—stopping the programming,
7—stopping the charge pump.

Since the programming of an EEPROM cell makes it necessary to inject electrical charges into the programmed cell, steps 4, 5 and 6 are accompanied by an overconsumption of current of chaotic appearance which depends essentially on the value of $V_{CC}$, the address, the programmed value and the temperature of the component.

In order to mask the current consumption footprint of a cryptographic calculation for example, the invention proposes to use the chaotic consumption of steps 4, 5 and 6 by performing the cryptographic calculation during step 5 for a period of a few microseconds.

To do this, the cryptographic calculation is performed according to the following steps:

1—starting the charge pump,
2—presentation of a random data item on the data bus,
3—presentation of a writing address on the address bus,
4—initiation of the programming,
5—effecting the cryptographic calculation,
6—stopping the programming,
7—stopping the charge pump.

Through these steps, the footprint of the current consumption due to the cryptographic calculation of step 5 is masked by the writing of the random data item in a given part 26 of the EEPROM memory reserved for this function.

Instead of a cryptographic calculation, step 5 can consist of any operation to be protected vis-à-vis the outside.

In addition, instead of performing these operations to be protected during a writing in the memory 14, they can be done during an erasure of the memory 14.

What is claimed is:

1. A device for hiding operations performed by a component included to be integrated into a smart card, the device comprising:

means for modifying electrical current consumption of said component during performance of said operations, said means for modifying comprising at least one circuit for integrating the current of the component so as to average the variations in this current over time.

2. A device for hiding operations performed by a component of a smart card, the smart card comprising an EEPROM memory and a microprocessor, the device comprising:

means for modifying electrical current consumption of said component during the performance of said operations, wherein said means for modifying the current consumption of the component is configured to initiate a write or erase operation in a portion of the EEPROM memory simultaneous with an operation of the microprocessor in said smart card.

3. A device according to claim 2, wherein the portion of said memory is dedicated to the recording of a random data item.

4. A device according to claim 2, wherein the activation of the means of modifying the current consumption is controlled by a microprocessor so as to be activated solely for the operations to be protected.

5. A device according to claim 2, wherein said microprocessor performs a cryptographic calculation according to the following steps:

starting of a charge pump,
   presentation of a random data item on a data bus,
   presentation of a writing address on an address bus,
   initiation of programming,
   performing the cryptographic calculation,
   stopping the programming, and
   stopping the charge pump,
   so as to mask the footprint of the current consumption occasioned by said cryptographic calculation.

6. A method for hiding operations performed by a component, comprising the following steps:

starting of a charge pump,
   presentation of a random data item on a data bus,
   presentation of a writing address on an address bus,
   initiation of programming,
   performing a cryptographic calculation,
   stopping the programming, and
   stopping the charge pump.

* * * * *